US008757084B2

(12) United States Patent (10) Patent No.: US 8,757,084 B2
Condit et al. (45) Date of Patent: Jun. 24, 2014

(54) UNDERWATER ROBOTIC VENTING AND INSPECTION SYSTEM

(75) Inventors: Jeff Condit, Escondico, CA (US); Nicholas Hartman, San Diego, CA (US); Dylan Mora, San Diego, CA (US); Brad Lafferty, Encinitas, CA (US); Kyle Knight, San Diego, CA (US); Jamie Hogan, San Diego, CA (US); Cyril Poissonnet, San Diego, CA (US); Steve Everett, Hixson, TN (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 87 days.

(21) Appl. No.: 13/453,237

(22) Filed: Apr. 23, 2012

(65) Prior Publication Data

US 2012/0318187 A1    Dec. 20, 2012

Related U.S. Application Data

(60) Provisional application No. 61/478,469, filed on Apr. 22, 2011.

(51) Int. Cl.
*B63G 8/00* (2006.01)

(52) U.S. Cl.
USPC ............................ 114/313; 114/222; 114/337

(58) Field of Classification Search
USPC .......... 114/312, 313, 337, 222; 367/129, 131, 367/133; 441/23
See application file for complete search history.

(56) References Cited

U.S. PATENT DOCUMENTS

| 5,947,051 | A | 9/1999 | Geiger | |
| 6,317,387 | B1 * | 11/2001 | D'Amaddio et al. | 367/129 |
| 6,352,389 | B1 | 3/2002 | Rines et al. | |
| 6,484,660 | B1 * | 11/2002 | English | 114/312 |
| 6,860,219 | B1 | 3/2005 | Dempster | |
| 7,345,705 | B2 * | 3/2008 | Croasdale | 348/335 |
| 8,511,247 | B2 * | 8/2013 | Inoue | 114/337 |
| 2005/0135904 | A1 | 6/2005 | Wivagg et al. | |
| 2005/0204992 | A1 | 9/2005 | Shelton et al. | |

FOREIGN PATENT DOCUMENTS

WO    WO2010/138065 A1    12/2010

OTHER PUBLICATIONS

International Preliminary Report on Patentability for PCT/US2012/034660 dated Oct. 22, 2013 (Form PCT/IB/373, PCT/ISA/237).

* cited by examiner

*Primary Examiner* — Lars A Olson
(74) *Attorney, Agent, or Firm* — Richard J. Coldren; Westinghouse Electric Company LLC

(57) ABSTRACT

An improved inspection apparatus includes a control apparatus, a tractor apparatus comprising a tractor and a drive mechanism connected together, the drive mechanism being connected with the control apparatus, a tether apparatus disposed on the tractor and being movable between a deployed position and a retracted position, and a buoy apparatus. The buoy apparatus is connected with the tether apparatus and includes a buoy and a camera apparatus, the buoy in a condition submerged in a fluid applying a buoyant force to the camera apparatus whereby in the deployed position of the tether apparatus the buoy apparatus is in an elevated position situated relatively higher in a vertical direction than in the retracted position of the tether apparatus wherein the buoy apparatus is in another position situated relatively lower in the vertical direction, the camera apparatus being structured to provide a visual output signal to the control apparatus.

22 Claims, 3 Drawing Sheets

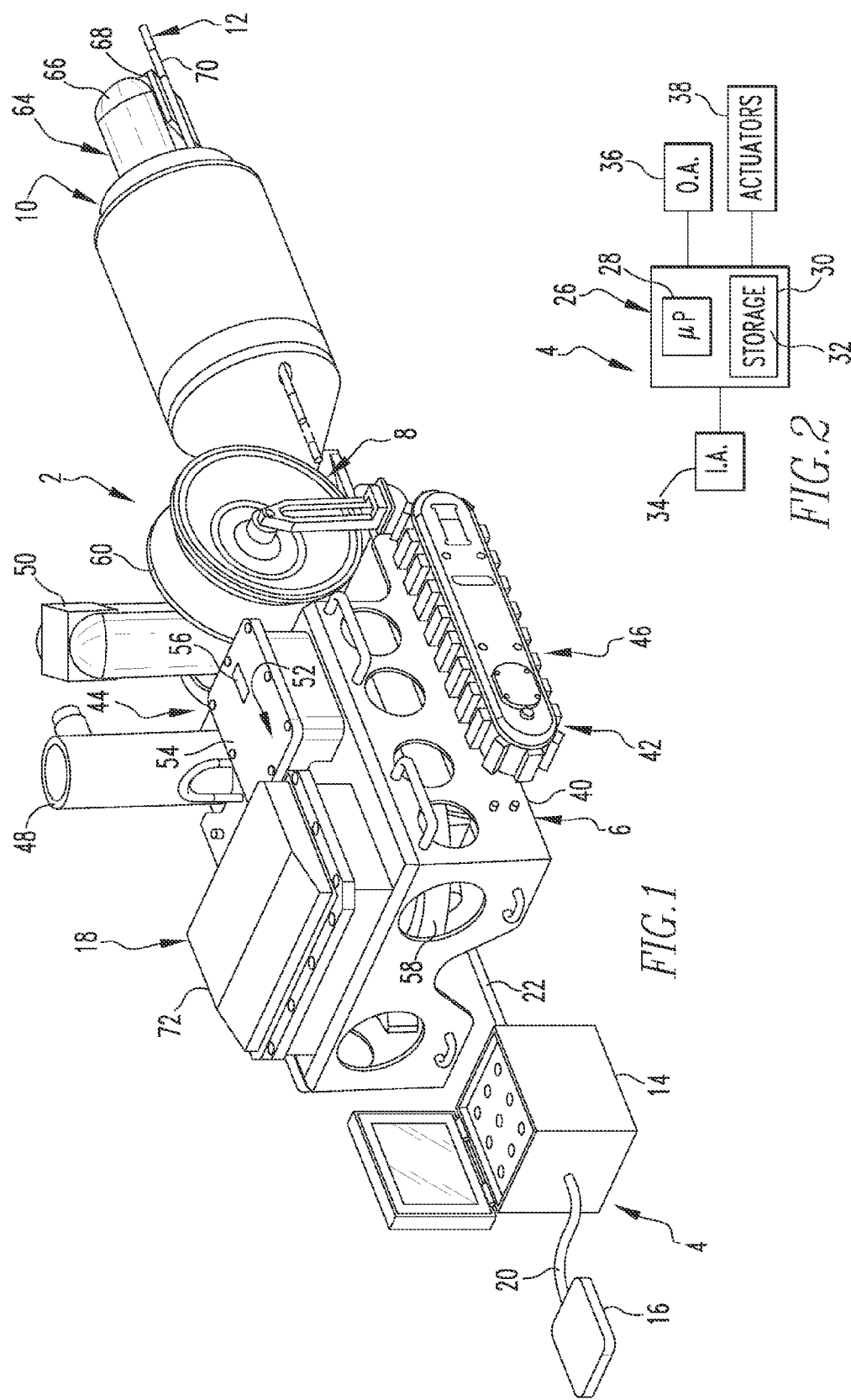

UNDERWATER ROBOTIC VENTING AND INSPECTION SYSTEM

CROSS-REFERENCE TO RELATED APPLICATION

The present application claims priority from U.S. Provisional Patent Application No. 61/478,469 filed Apr. 22, 2011, and entitled UNDERWATER ROBOTIC INSPECTION SYSTEM, the disclosures of which are incorporated herein by reference.

FIELD OF THE INVENTION

The present invention relates to a system for inspection of submerged environments, such as can exist with respect to certain structures of nuclear reactors.

BACKGROUND OF THE INVENTION

The primary safety consideration in the operation of any nuclear reactor is the control and containment of radioactive material and radioactivity, under both normal and accident conditions. Numerous controls and barriers are installed in nuclear plants to protect workers and the public from the effects of radiation.

Regular inspection of nuclear reactors is essential to avoid catastrophic breakdowns and to properly schedule preventive maintenance procedures. In boiling water reactors (BWRs), one area that requires inspection is the steam dryer assembly. The steam dryer assembly is mounted in the reactor vessel above the steam separator assembly to form the top and sides of the wet steam plenum. Wet steam flows upward and outward through the dryers. Moisture is removed by impinging the wet steam on the dryer vanes, and the condensed moisture flows down through drains to the reactor water. Although the steam dryer is not a safety-related component, the assembly is designed to withstand design basis events without the generation of loose parts, and the dryer is expected to maintain structural integrity.

A major challenge to the inspection of steam dryers is that they are in the shape of an inverted can with the "top" being closed. Access for inspection is gained through relatively narrow openings near the bottom of the structure, so the inspection device must travel upward after passing through the openings.

Most attempts to address this problem have involved the use small Remote Operated Vehicles (ROVs) or other tethered vehicles. The PHANTOM® Firefly™ product from Deep Ocean Engineering is one such commercially-available ROV camera system designed for inspection of BWR reactors. Like most ROVs, this system uses a combination of buoyancy and thrusters to maneuver the vehicle within the vessel. This can be problematic because of the many obstacles and small spaces created by the internal hardware within the structure, which the vehicle must navigate around with an umbilical trailing behind it. Moreover, difficulty has been experienced in keeping a freely movable ROV in a given position for a period long enough to inspect a given region with a camera. Improvements thus would be desirable.

SUMMARY OF THE INVENTION

The present invention provides Inspection and Evaluation (I&E) monitoring capabilities for the various Steam Dryers associated with operating BWRs. This tool assists with the inspection of the steam dryer configurations for different plants when the steam dryer is removed from the reactor vessel and is placed into an equipment pit and is submerged in a fluid such as water. The tool employs an underwater crawler or tractor with an inspection buoy. The crawler drives on the floor of the equipment pit or other structure in a location underneath the steam dryer and deploys a buoy into the upper internal regions of the steam dryer to enable visual inspection of welds, strength members, and the like. The system includes main control device, one underwater crawler with inspection buoy and one interconnection cable for connecting the main control device to the crawler. The system may additionally include a handheld unit that is connected with the main control device by another connection.

Other aspects of the invention are provided by an improved inspection apparatus, the general nature of which can be stated as including a control apparatus, a tractor apparatus comprising a tractor and a drive mechanism connected together, the drive mechanism being connected with the control apparatus, a tether apparatus disposed on the tractor and being movable between a deployed position and a retracted position, and a buoy apparatus. The buoy apparatus is connected with the tether apparatus and can be generally stated as including a buoy and a camera apparatus, the buoy in a condition submerged in a fluid being structured to apply a buoyant force to the camera apparatus whereby in the deployed position of the tether apparatus the buoy apparatus is in an elevated position situated relatively higher in a vertical direction than in the retracted position of the tether apparatus wherein the buoy apparatus is in another position situated relatively lower in the vertical direction, the camera apparatus being structured to provide a visual output signal to the control apparatus.

Further aspects of the invention are provided by an improved apparatus structured to vent at least a portion of an air pocket trapped at an underside of an article submerged in a liquid. The general nature of the apparatus can be stated as including a control apparatus, a tractor apparatus that can be stated as including a tractor and a drive mechanism connected together, the drive mechanism being connected with the control apparatus, a tether apparatus disposed on the tractor and being movable between a deployed position and a retracted position, and a buoy apparatus. The buoy apparatus is connected with the tether apparatus and can be generally stated as including a buoy and a vent apparatus, the buoy in a condition submerged in the liquid being structured to apply a buoyant force to at least a portion of the vent apparatus whereby in the deployed position of the tether apparatus the buoy apparatus is in an elevated position situated relatively higher in a vertical direction than in the retracted position of the tether apparatus wherein the buoy apparatus is in another position situated relatively lower in the vertical direction, the at least portion of the vent apparatus being structured to be in fluid communication with the air pocket and to vent at least a portion of the air pocket in the elevated position of the buoy apparatus.

BRIEF DESCRIPTION OF THE DRAWINGS

A further understanding of the disclosed and claimed concept can be gained from the following Detailed Description when read in conjunction with the accompanying drawings in which:

FIG. 1 is a depiction of an improved inspection and venting apparatus in accordance with the disclosed and claimed concept;

FIG. 2 is a schematic depiction of a control apparatus of the apparatus of FIG. 1;

Similar numerals refer to similar parts throughout the specification.

DETAILED DESCRIPTION

Figure 3:
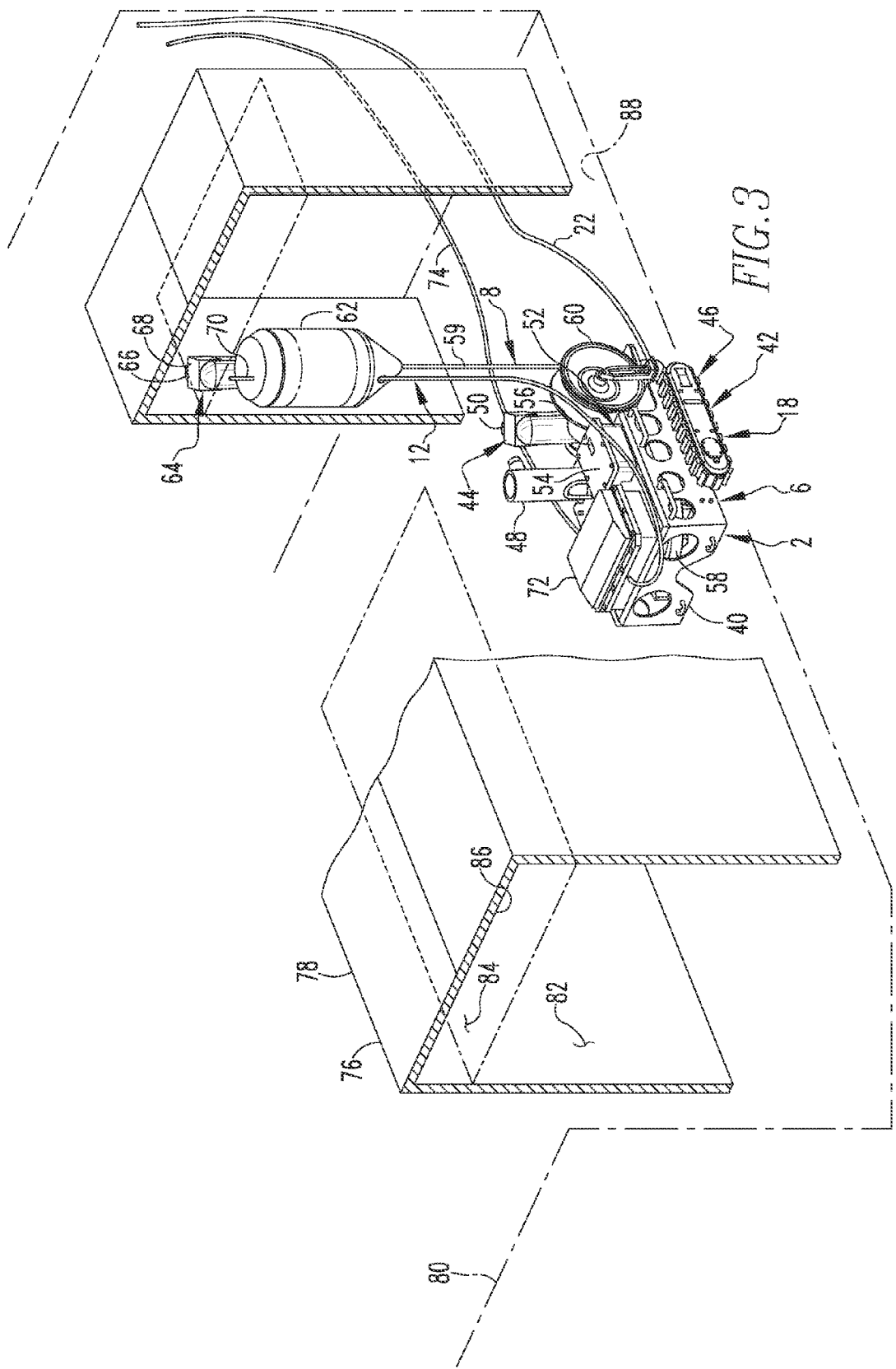
FIG. 3 is a perspective view of the apparatus situated in a submerged condition in an equipment pit and situated to vent an air pocket trapped at an underside of a portion of a steam dryer.
Figure 4:
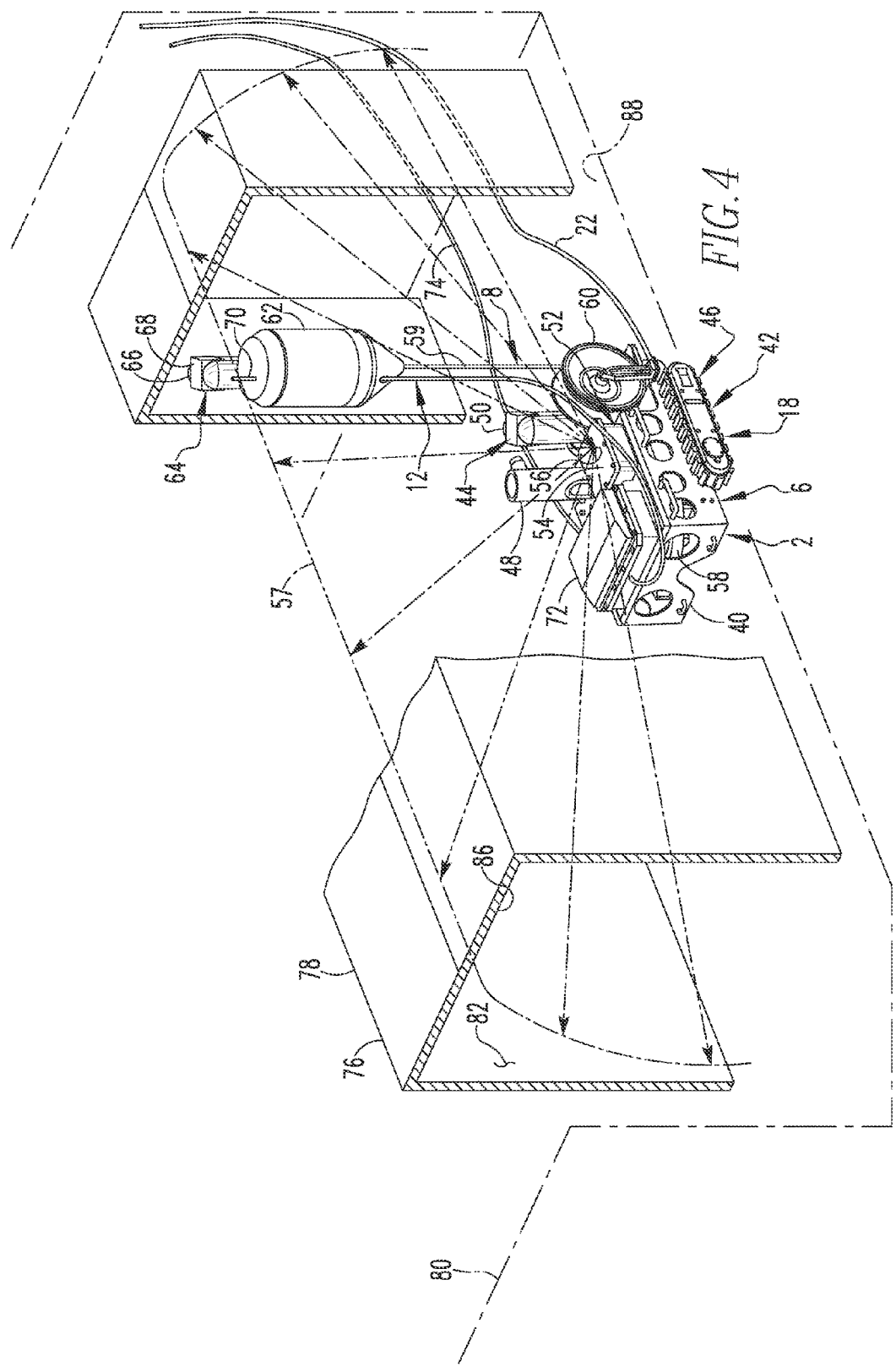
FIG. 4 is a depiction of the apparatus in a submerged condition and in an AUTOMATIC mode of inspecting the steam dryer.

An improved inspection and venting apparatus 2 is depicted schematically in FIG. 1 and is depicted at least in part in FIGS. 2-4. The inspection apparatus 2 is advantageously employable to remotely perform visual inspection operations in a submerged environment, such as in an environment where an object is submerged in water or other fluid.

The inspection apparatus 2 can be said to include a control apparatus 4, a tractor apparatus 6, a tether apparatus 8, a buoy apparatus 10, and a venting apparatus 12. In FIG. 1, the control apparatus 4 is depicted as including a control device 14 and a handheld unit 16. Further in FIG. 1, the tractor apparatus 6, the tether apparatus 8, the buoy apparatus 10, and the venting apparatus 12 together can be said to form a remote portion 18. In the typical application of the inspection apparatus 2, the remote portion 18 is situated and operated in a submerged environment while the control unit 14 and the handheld unit 16 are situated elsewhere, i.e., remote from the submerged location. While the control apparatus 4 is depicted in FIG. 1 in an exemplary fashion as being separate from the remote portion 18, it is understood that portions of the control apparatus 4 are actually situated on the remote portion 18, and the exemplary depiction is thus not intended to be limiting as to the arrangement of the components of the inspection apparatus 2.

Further regarding FIG. 1, the handheld unit 16 and the control device 14 are in communication with one another via a connection 20 which is depicted herein as being a hard wired connection, although a wireless connection can be employed without departing from the present concept. Moreover, a first umbilical 22 is depicted as extending between the control device 14 and the remote portion 18 and is depicted as being a hard wired connection. The depicted first umbilical 22 can potentially be replaced with a wireless connection depending upon the needs of the particular application.

As can be seen from FIG. 2, the control apparatus 4 can be stated as including a processor apparatus 26 that includes a processor 28 and a storage 30. The processor 28 can be any of a wide variety of processors, such as a microprocessor or other processor, without limitation, and the storage 30 likewise can be in any of a wide variety of forms such as RAM, ROM, EPROM, EEPROM, FLASH, and the like without limitation. The storage 30 has stored thereon a number of routines 32 which are executable on the processor 28 to cause the inspection apparatus 2 to perform certain operations. As employed herein, the expression "a number of" and variations thereof shall refer broadly to any non-zero quantity, including a quantity of one.

The control apparatus 4 can further be stated as including an input apparatus 34 that provides input signals to the processor apparatus 26 and an output apparatus 36 that receives output signals from the processor apparatus 26. The input apparatus 34 can include any of a wide variety of input devices such as switches, joysticks, an input component of a touch-sensitive display, and the like without limitation. The output apparatus 36 can likewise include any of a wide variety of devices such as video displays, lights, audible output elements, and the like without limitation.

The control apparatus 4 further includes a number of actuators 38 that are depicted in a schematic fashion in FIG. 2 but which typically will all be situated on the remote portion 18. The actuators 38 are controlled by the processor apparatus 26 in response to input signals from the input apparatus 34 and other signals and are operable to operate portions of the tractor apparatus 6, the tether apparatus 8, the buoy apparatus 10, and the venting apparatus 12. The actuators 38 can be any structures that are suited to perform operations needed on the remote portion 18 in response to electronic signals generated by the processor apparatus 26 or generated in other fashions.

As can be understood from FIGS. 1, 3, and 4, the tractor apparatus 6 can be said to include a tractor 40 and a drive mechanisms 42 that are connected together. The tractor 40 functions generally as a support or frame upon which the tether apparatus 8, the buoy apparatus 10, the venting apparatus 12, and portions of the control apparatus 4 are disposed. In the exemplary embodiment depicted generally herein, the tractor apparatus 6 further includes a camera apparatus 44 situated on the tractor 40 for use in positioning the tractor apparatus 6 and for other purposes such as are set forth in greater detail below.

The drive mechanism 42 includes a track assembly 46 that includes an exemplary pair of tracks movably situated on the tractor 40. The drive mechanism 42 further includes a motor 48 and one or more mechanical motion distributors that extend between the motor 48 and the track assembly 46 in order to provide motile forces to the track assembly 46 and to steer the tractor apparatus 6 in response to steering commands and other commands generated by the processor apparatus 26 and otherwise.

The camera apparatus 44 can be said to include a camera 50 and an illumination system 52, both of which are disposed on the tractor 40. The camera can be any of a wide variety of camera devices and, in the depicted exemplary embodiment, is suited to an underwater environment and is controllable for tilt, pan, and zoom. The camera 50 provides visual output signals to the output apparatus 36 for viewing, such as on a visual display.

The illumination system 52 can be said to include an illumination device 54 and an aiming device 56, both of which produce electromagnetic energy that is detectable by the camera 50. In the depicted exemplary embodiment, the illumination device 54 includes a number of LED elements which generate white, i.e., visible, light. The illumination device 54 is oriented to provide illumination generally in an upward direction if it is assumed that the track assembly 46 is situated on a generally horizontally-oriented platform or base. The illumination device 54 thus is configured to illuminate the underside of an object beneath which the remote portion 18 is situated.

The aiming device 56 includes a laser or other sources of electromagnetic energy and outputs a plane 57 of illumination such as is depicted generally in FIG. 4 for purposes of orienting the tractor apparatus 6 with respect to an object under test or inspection. More specifically, and as can be understood from FIG. 4, the aiming device 56 projects onto other structures a line of electromagnetic energy such as light that is detectable by the camera 50 and which is aligned with the direction of the tractor apparatus 6. That is, the aiming device 56 is oriented such that its output when impinged on another object indicates the direction of travel of the tractor apparatus 6 if the motor 48 is energized to operate the track assembly 46 in a forward or reverse direction.

Accordingly, during operation of the inspection apparatus 2 the input apparatus 34 can be manipulated operate the drive mechanism 42 to pivot the tractor 40 until the visual output of the aiming device 56 is oriented in a desired direction of travel of the tractor apparatus 6. The technician can then input a predetermined command which will cause the control apparatus 4 to initiate an AUTOMATIC mode in which the motor 48 is energized and drives the track assembly 46 to move the remote portion 18 in a forward direction at, for example, a fixed speed. The AUTOMATIC mode is initiated by a routine 32 being executed on the processor 28 and causing appropriate commands to be communicated to one or more of the actuators 38 to drive the motor 48 in the indicated fashion.

The tether apparatus 8 can be said to include a winch 58 that winds and unwinds a second umbilical 59 (FIGS. 3 and 4) that moves on a pulley 60. Responsive to commands from the control apparatus 4, the winch 58 is operable to be moved between a deployed position, such as is depicted generally in FIGS. 3 and 4 where a length of the second umbilical 59 is unwound from the winch 58, and a retracted position (FIG. 1) in which the second umbilical 59 is largely wound about the winch 58.

The buoy apparatus 10 includes a buoy 62 that is affixed to the end of the second umbilical 59 that is opposite the winch 58. The buoy apparatus 10 further includes a camera apparatus 64 mounted to the buoy 62. As is generally understood, the buoy 62 is a buoyant device which, in an environment at least partially submerged in a fluid, provides a buoyant force to the camera apparatus 64. As such, when the second umbilical 59 is at least partially unwound from the winch 58, the buoyant force generated by the buoy 62 in the fluid causes the camera apparatus 64 to be buoyantly raised to an elevated position that is vertically higher than the buoy 62 and the camera apparatus 64 would otherwise be if the second umbilical 59 is in its retracted position (as is depicted generally in FIG. 1).

The camera apparatus 64 can be said to include a camera 66 and an illumination device 68. The camera 66 is similar to the camera 50, and the illumination device 68 is similar to the illumination device 54. However, in the depicted exemplary embodiment, the illumination device 54 moves with the camera 66 in the pan and tilt directions in order to illuminate the subject matter that is being observed by the camera 66.

The venting apparatus 12 can be said to include a vent tube 70 that is situated on the buoy 62, and to further include a vacuum pump 72 that is disposed on the tractor 40 and that is in fluid communication with the vent tube 70 to provide a reduced pressure to the vent tube 70. The venting apparatus 12 in the depicted exemplary embodiment further includes an exhaust tube 74 that is in fluid with the vacuum pump 72 and which receives an increased pressure from the vacuum pump 74 in order to exhaust one or more fluids such as gas or a mixture of gases (such as air) as a part of the inspection operation.

More specifically, the inspection apparatus 2 is advantageously usable to perform inspection operations and other operations on portions of a steam dryer (schematically depicted at the numeral 78 in FIGS. 3 and 4), such as might include a hood 76 of the steam dryer 78. It is understood that the steam dryer 78 will most typically include a plurality of the hoods 76, and the hoods 76 may be of the same configuration or other configurations. One exemplary use of the advantageous method described herein is to employ the inspection apparatus 2 to inspect the hood 76, whereby the hood 76 is an object under test or inspection.

In order to inspect the hood 76, the steam dryer 78 is typically removed from a reactor vessel and is placed into an equipment pit (such as is depicted schematically in FIGS. 3 and 4 at the numeral 80) that is at least partially filled with water 82. Due to the configuration of the hood 76, when the steam dryer 78 is removed from the reactor vessel and is placed into the equipment pit 80, air typically becomes trapped and forms an air pocket 84 at an underside 86 of the hood 76. The venting apparatus 12 is advantageously usable to vent at least a portion of the air pocket 84 to the exterior of the equipment pit 80. This is desirable for a number of reasons, not the least of which is that the buoy 62 is configured to provide a buoyant force in a fluid (water in the depicted example) and thus will typically be unable to provide a buoyant force to the camera apparatus 64 within the air pocket 84. While the buoy 62 potentially could be configured to include, for instance, helium which would provide a buoyant force both in water and in air, in the depicted exemplary embodiment the buoy 62 is filled with air, and the venting apparatus 12 is thus advantageously employed to vent some or all of the air pocket 84 from the underside 86 of the hood 76 in order to permit inspection thereof by camera apparatus 64.

In operation, the remote portion 18 is lowered into the equipment pit 80 to cause the track assembly 46 to engage a floor 88 of the equipment pit 80. Depending upon the configuration of the first umbilical 22, the lowering of the remote portion 18 can be performed by hanging it from the first umbilical 22, perhaps with the additional use of strain relief structures between the first umbilical 22 and the tractor 40. The illumination device 54 and/or the aiming device 56 are then energized in order to enable the camera 50 to provide a visual image of the floor area of the equipment pit 80 and to permit the tractor apparatus 6 to be steered to a location underneath the hood 76. During such an initial lowering of the remote portion 18, the tether apparatus 8 is in its retracted position, as is depicted generally in FIG. 1.

Once the tractor apparatus 6 is positioned such that the buoy 62 is generally situated underneath the hood 76 and the air pocket 84, the winch 58 can be energized to deploy at least a portion of the second umbilical 59. Due to the buoyant force provided by the buoy 62 on the camera apparatus 64, such deployment of the second umbilical 59 causes the camera apparatus 64 to move vertically upward as the result of such buoyant force 62. As the second umbilical 59 is fed outward from the pulley 60 by the winch 68, the buoy 62 and the camera apparatus 64 rise vertically within the water 82. Once the buoy 62 has risen within the water 82 sufficiently to cause the vent tube 70 to be in fluid communication with the air pocket 84, the vacuum pump 72 can be energized to apply to the vent tube 70 a reduced pressure to cause some or all of the air pocket 84 to be vented from the underside 86 and to be exhausted via the exhaust tube 74 to a location external to the equipment pit 80. It is noted that alternative embodiments of the venting apparatus 12 may be configured to perform the venting operation based merely upon hydraulic principles and without the use of the vacuum pump 72.

With the air pocket 84 partially or completely vented from the hood 76, the aiming device 56 can be energized (if not already energized) to cause the light plane 57 to be impinged upon the underside 86 or other portions of the hood 76 or equipment pit 80 in order to indicate what will be the direction of travel of the tractor apparatus 6 when the drive mechanism 42 is energized in a forward or reverse direction. The tractor apparatus 6 can be pivoted and/or translated by operating movement controls of the input apparatus 34 that are situated on the control device 14 and/or on the handheld unit 16. In so doing, the camera apparatus 44 on the tractor 40 may be employed to provide a visual output on the output apparatus 36 in order to enable the tractor apparatus 6 to be manipulated to a desirable position with respect to the hood 76.

Once the tractor apparatus 6 is desirably positioned, the tether apparatus 8 can be energized, if necessary, to further deploy or partially retract the buoy apparatus 10, as needed, in order to perform an inspection of the hood 76 with the camera apparatus 64. The drive mechanism 72 can then be energized by the technician to cause the tractor apparatus 6 and thus the camera apparatus 64 to translate with respect to the hood 76 and to enable inspection of the hood 76, particularly the underside 86 thereof or other portions thereof, as appropriate. While such translation of the tractor apparatus 6 can be performed manually by the technician, the technician can alternatively actuate the AUTOMATIC mode to cause the tractor apparatus 6 to travel in a pre-programmed fashion which, in the depicted exemplary embodiment, is a fixed speed in the forward direction, to cause the camera apparatus 64 to be moved along the hood 76. During such operation, the visual output signals from the camera 66 can be output on the output apparatus 36 and most likely are additionally stored in the storage 30 or elsewhere for future review and analysis. When the hood 76 has been fully inspected, the remote portion 18 can be moved to another hood and the foregoing procedures repeated. If all of the hoods and other portions of the steam dryer 78 have been inspected, the remote portion 18 can be removed from the equipment pit 80.

It thus can be seen that the advantageous inspection apparatus 2 can be used not only to vent the air pocket 84 from a location within the equipment pit 80, but it can also perform an inspection of the underside 86 of the steam dryer 78 in a condition submerged in a fluid such as water. Since the tractor 40 is situated on the floor 88 of the equipment pit 80, the buoyant force applied by the buoy 62 to the camera apparatus 64 easily maintains the camera apparatus 64 at a fixed (and adjustable) vertical height with respect to the hood 76, which facilitates inspection.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. An inspection apparatus comprising:
    a control apparatus;
    a tractor apparatus comprising a tractor and a drive mechanism connected together, the drive mechanism being connected with the control apparatus;
    a tether apparatus disposed on the tractor and being movable from a retracted position toward a deployed position and from the deployed position toward the retracted position; and
    a buoy apparatus connected with the tether apparatus and comprising a buoy and a camera apparatus, the buoy in a condition submerged in a fluid being structured to apply a buoyant force to the camera apparatus whereby in the deployed position of the tether apparatus the buoy apparatus is in an elevated position situated higher in a vertical direction than in the retracted position of the tether apparatus wherein the buoy apparatus is in another position situated lower in the vertical direction, the camera apparatus being structured to provide a visual output signal to the control apparatus.

2. The inspection apparatus of claim 1 wherein the control apparatus comprises a control device that is situated remote from the tractor apparatus and that is structured to communicate electronic commands to the tractor apparatus.

3. The inspection apparatus of claim 2 wherein the control apparatus further comprises a visual output element that is structured to output a visual depiction in response to the visual output signal.

4. The inspection apparatus of claim 1 wherein the camera apparatus comprises a camera element and an illumination element, the camera element being structured to be movable in response to camera movement signals received from the control apparatus.

5. The inspection apparatus of claim 1 wherein the tractor apparatus further comprises another camera apparatus situated on the tractor and structured to provide another visual output signal to the control apparatus.

6. The inspection apparatus of claim 5 wherein the camera apparatus comprises a camera element and an illumination apparatus, the illumination apparatus comprising an illumination element that is structured to provide illumination in the direction of the elevated position of the buoy apparatus.

7. The inspection apparatus of claim 6 wherein the illumination apparatus further comprises an aiming device that is structured to visually output an alignment element that is detectable by the camera element.

8. The inspection apparatus of claim 7 wherein the aiming device is structured to output as the alignment element a beam of visible light that is aligned with a direction of travel of the tractor apparatus.

9. The inspection apparatus of claim 7 wherein the control apparatus comprises a processor and a storage, the storage having stored therein instructions which, when executed on the processor, cause the drive mechanism to drive the tractor in the direction of travel.

10. An apparatus structured to vent at least a portion of an air pocket trapped at an underside of an article that is at least partially submerged in a liquid, the apparatus comprising:
    a control apparatus;
    a tractor apparatus comprising a tractor and a drive mechanism connected together, the drive mechanism being connected with the control apparatus;
    a tether apparatus disposed on the tractor and being movable between a deployed position and a retracted position; and
    a buoy apparatus connected with the tether apparatus and comprising a buoy and a vent apparatus, the buoy in a condition submerged in the liquid being structured to apply a buoyant force to at least a portion of the vent apparatus whereby in the deployed position of the tether apparatus the buoy apparatus is in an elevated position situated higher in a vertical direction than in the retracted position of the tether apparatus wherein the buoy apparatus is in another position situated lower in the vertical direction, the at least portion of the vent apparatus being structured to be in fluid communication with the air pocket and to vent at least a portion of the air pocket in the elevated position of the buoy apparatus.

11. The apparatus of claim 10 wherein the vent apparatus comprises a conduit and a pump in fluid communication with one another, at least a portion of the conduit being disposed on the buoy, the pump being disposed on the tractor.

12. A method of inspecting a portion of an object under test that is at least partially submerged in a fluid, the method comprising:
    deploying within the fluid a buoy at a first position situated underneath at least a portion of the object under test;
    employing a buoyant force between the buoy and the fluid to raise a camera connected with the buoy to a second position vertically higher than the first position;

receiving from the camera at the second position an output signal that is representative of at least a portion of a region underneath the object under test; and at least partially retracting the buoy and the camera from the second position toward the first position.

13. The method of claim 12, further comprising positioning on a floor of a vessel a tractor apparatus upon which the buoy is disposed.

14. The method of claim 13, further comprising translating the tractor apparatus along the floor to move the buoy from an initial position to the first position.

15. The method of claim 14, further comprising operating a drive mechanism of the tractor apparatus to at least initiate the translating of the tractor apparatus.

16. The method of claim 14, further comprising at least partially deploying an umbilical to which the buoy is connected to permit the buoyant force to raise the buoy and the camera to the second position.

17. The method of claim 16, further comprising:
retracting the umbilical to overcome the buoyant force and to initiate the at least partial retracting of the buoy and the camera toward the tractor apparatus; and
removing the tractor apparatus from the fluid.

18. The method of claim 14, further comprising:
energizing an illumination system disposed on the tractor apparatus to impinge a beam of visible light onto an underside of at least a portion of the object under test; and
employing the impinged beam of visible light and an output signal from another camera situated on the tractor apparatus that is representative of at least a portion of the impinged beam to steer the tractor apparatus.

19. The method of claim 18, further comprising energizing as at least a portion of the illumination system an aiming device that outputs a plane of laser light for impingement onto the underside of the at least portion of the object under test.

20. A method of inspecting a portion of an object under test that is at least partially submerged in a fluid, the method comprising:
deploying within the fluid a buoy at a first position situated underneath at least a portion of the object under test;
employing a buoyant force between the buoy and the fluid to raise a camera connected with the buoy to a second position vertically higher than the first position;
receiving from the camera at the second position an output signal that is representative of at least a portion of a region underneath the object under test; and
employing the buoyant force to place at least a portion of a venting apparatus in fluid communication with an air pocket situated underneath at least a portion of the object under test; and
venting at least a portion of the air pocket.

21. An apparatus structured to vent at least a portion of a first fluid that is buoyantly situated vertically above a second fluid, the apparatus comprising:
a control apparatus;
a tractor apparatus comprising a tractor and a drive mechanism connected together, the drive mechanism being connected with the control apparatus;
a tether apparatus disposed on the tractor and being movable between a retracted position and a deployed position; and
a buoy apparatus connected with the tether apparatus and comprising a buoy and a vent apparatus, the buoy in a condition submerged in the second fluid being structured to apply a buoyant force from the second fluid to at least a portion of the vent apparatus whereby in the deployed position of the tether apparatus the buoy apparatus is in an elevated position situated vertically higher than in the retracted position of the tether apparatus wherein the buoy apparatus is in another position situated vertically lower, the at least portion of the vent apparatus being structured to be in fluid communication with the first fluid and to vent at least a portion of the first fluid in the elevated position of the buoy apparatus.

22. The apparatus of claim 21 wherein tether apparatus is movable from the retracted position toward the deployed position and from the deployed position toward the retracted position.

* * * * *